United States Patent [19]

Park et al.

[11] Patent Number: 5,273,603
[45] Date of Patent: Dec. 28, 1993

[54] METHOD FOR MANUFACTURING PRESSURE VESSELS HAVING HOLES OF DIFFERENT DIAMETERS

[75] Inventors: Byeong Yeol Park; Sung Ho Yoon; Bal Jung, all of Daejon, Rep. of Korea

[73] Assignee: Agency for Defense Development, Daejon, Rep. of Korea

[21] Appl. No.: 896,159

[22] Filed: Jun. 10, 1992

[30] Foreign Application Priority Data

Jun. 13, 1991 [KR] Rep. of Korea ............... 9742/1991

[51] Int. Cl.$^5$ ........................................... B65H 81/00
[52] U.S. Cl. ........................... 156/175; 156/169; 156/173; 156/172; 156/250; 156/256; 156/425
[58] Field of Search ............... 156/161, 170, 165, 169, 156/172, 173, 175, 425, 250, 256; 220/588, 589, 590, 591, 414

[56] References Cited

U.S. PATENT DOCUMENTS

| | | | |
|---|---|---|---|
| 3,172,252 | 3/1965 | Boek | 220/590 X |
| 3,228,549 | 1/1966 | Courtney | 220/589 |
| 3,750,823 | 8/1973 | Carter et al. | 220/590 X |
| 3,962,506 | 6/1976 | Dunahoo | 156/156 X |
| 4,053,081 | 10/1977 | Minke | 220/589 |
| 4,561,568 | 12/1985 | Hoffmeister et al. | 220/590 X |
| 4,854,988 | 8/1989 | Voirol et al. | 156/173 X |

FOREIGN PATENT DOCUMENTS

8705261 9/1987 PCT Int'l Appl. ............... 156/172

OTHER PUBLICATIONS

Peters, S. T., et al, "Filament Winding" *Engineered Materials Handbook,* vol. 1, *Composites,* ASM International, 1987, pp. 504–518.

*Primary Examiner*—Jeff H. Aftergut
*Attorney, Agent, or Firm*—Scully, Scott, Murphy & Presser

[57] ABSTRACT

A method for filament winding a pressure vessel having at both end domes thereof holes of different diameters and preferably used for a high pressure combustor of a rocket engine. The present method comprises first and second winding processes. In the first process, the first mandrel on which the winding band is wound is provided with a jig which makes the outer diameters of the opposite bosses of the mandrel be equal to each other and is removed after hardening process. In the second process, the winding band is again wound on the second mandrel comprising a first body obtained from the first process and provided with a jig which makes the outer diameters of the opposite bosses of the second mandrel be equal to each other and is removed after hardening process. In result, the winding band is always wound on the mandrel along straight winding passages in the two winding processes because the outer diameters of the opposite bosses of each mandrel are equal to each other, thereby causing the pressure vessel manufactured by the present method to have a good structural strength efficiently enduring high pressure.

1 Claim, 2 Drawing Sheets

METHOD FOR MANUFACTURING PRESSURE VESSELS HAVING HOLES OF DIFFERENT DIAMETERS

BACKGROUND OF THE INVENTION

1. Field of the Invention

The present invention relates in general to a method for manufacturing pressure vessels having at both end domes thereof holes of different diameters and preferably used for high pressure combustors of rocket engines, and more particularly to a method for manufacturing such pressure vessels by a filament winding method.

2. Description of the Prior Art

Conventionally, several types of high pressure vessels or high pressure pipes which must efficiently endure high pressure and also have light weight are preferably made of a high strength material such as fiberglass reinforced plastics (FRP), generally obtained by impregnating a base material such as high strength glass fiber strands with a low pressure molding resin such as a thermosetting resin. In order to form the pressure vessels using FRP, there have been proposed several methods, for example, a filament winding method wherein the composite material of FRP obtained from impregnating the glass fiber filament with the thermosetting resin in liquid or gel is continuously spirally wound on a mandrel of a predetermined shape.

FIGS. 1A and 1B show a representative embodiment of the known filament winding method for manufacturing a conventional pressure vessel having opposite holes of equal outer diameters. As shown in the drawings, a winding band 3 obtained from impregnating a plurality of glass fibers with the thermosetting resin is continuously spirally wound on a cylindrical mandrel 1 having a predetermined cylindrical shape integrally formed with domes at both ends. The domes are provided at their peaks with metal bosses 2 each of which has an outer diameter d. Here let the outer diameter of the pressure vessel and the outer diameters of the two bosses 2 be D and $d(d=d_1=d_2)$, respectively, the winding inclination angle $\alpha$ of the winding band 3 on the mandrel with respect to the central axis of the mandrel 1 will be described as follows:

$$\alpha = \sin^{-1}(d/D) \qquad (1)$$

In winding the band 3 on the mandrel 1 the winding band 3 is repeatedly tightly wound on the cylindrical mandrel 1 such that it is tensioned. In result, the winding passage between two optional points of the winding band 3 on the mandrel 1 always represents a straight line. At the same time, the winding band 3 on the both domes tangentially passes by a point of the outer circumference of the bosses 2 so that it is always perpendicular to the radial direction of the bosses 2, respectively, as depicted in FIG. 1B.

In accordance with the expression (1), it is known that the winding angle $\alpha$ of the band 3 is proportional to the outer diameter d of the bosses 2 when the diameter D of the mandrel 1 is constant.

Thus, in case that the diameters $d_1$ and $d_2$ of the opposite bosses 2 of the mandrel 1 are equal to each other or the diameters $d_1$ and $d_2$ are very similar to each other such that the difference therebetween is negligible, the winding angle $\alpha$ of the band 3 on both domes are equal to each other so that a winding passage of the band 3 between two optional points of the mandrel 1 represents a straight line. Therefore, there will occur no problem in executing the conventional filament winding method for manufacturing the pressure vessels in case of the mandrel 1 including the bosses 2 of same or very similar diameters with or to each other.

However, if it is required to manufacture using the filament winding method a pressure vessel including opposite holes of different diameters, the mandrel 1 must have bosses 2 of different diameters, causing substantial diameter difference which can not be negligible. In this case, the winding angles $\alpha$ of the band 3 on the opposite domes are different from each other so that there occurs the following problems in executing the conventional filament winding method:

Let the band 3 be wound on the mandrel 1 on the basis of a dome having a boss 2 of a relatively smaller diameter. At the dome having the smaller diameter boss 2, the band 3 is wound on the mandrel 1 at a relatively gentle winding angle so as to maintain the perpendicular relationship with respect to the radial direction of the boss 2 of smaller diameter. Similarly at another dome having a boss 2 of a relatively larger diameter, the winding band 3 tends to be wound on the mandrel 1 at the same gentle winding angle as that of the dome having the smaller diameter boss. However, the winding band 3 has to tangentially pass by the outer circumference of the larger diameter boss 2 at the same time. In result, the winding band 3 on the dome having the larger diameter boss slightly slides due to the tensile force biased thereto, thereby causing the winding angle to vary. The winding band 3 thus tangentially passes by the outer circumference of the larger diameter boss 2 simultaneously with being wound on the mandrel 1 at a relatively steep winding angle.

Hence, the winding band 3 wound on the mandrel 1 at the gentle winding angle slides on the mandrel 1 such that the winding angle of the band 3 with respect to the whole surface of the mandrel 1 varies from the gentle winding angle at the side of the dome having the smaller diameter boss to the steep winding angle at the side of the other dome having the larger diameter boss. The winding passage of the winding band 3 between two optional points on the outer surface of the mandrel 1 is, therefore, not straight but curved.

On the other hand, let the winding band 3 be wound on the mandrel 1 on the basis of the dome having the relatively larger diameter boss 2, the winding band 3 thus tangentially passes by the outer circumference of the larger diameter boss 2 so that the winding angle of the band 3 on the mandrel 1 at the side of dome having the larger diameter boss is relatively steep. In this case, let the winding band 3 be wound without sliding on the mandrel 1 at the side of dome having the smaller diameter boss 2 irrespective of the diameter difference between two bosses 2, the band 3 is thus obliged to pass along a winding passage which is spaced apart from a point of the outer circumference of the smaller diameter boss 2 and also is perpendicular to the radial direction of the boss 2. Therefore at the dome having the smaller diameter boss, there remains a portion on which the winding band 3 is not wound so that it is impossible to provide a desired pressure vessel.

Additionally in case that the winding band 3 radially outwardly slides on the mandrel 1 at the side of the dome having the smaller diameter boss 2, the winding band 3 slips off the outer surface of the mandrel 1 such that it is impossible to wind the winding band 3 on the mandrel 1 as desired. On the contrary, if the winding band 3 radially inwardly slides on the mandrel 1 at the side of the dome having the smaller diameter boss 2, the winding band 3 tangentially contacts with a point of the outer circumference of the smaller diameter boss 2 such that due to the tensile force biased thereto the band 3 runs along a passage which is perpendicular to the radial direction of the smaller diameter boss 2 and has a relatively gentle winding angle than the winding angle at the side of the other dome having the larger diameter boss 2. The winding angle of the band 3 on the whole mandrel 1 thus varies from the gentle winding angle at the dome having the smaller diameter boss to the steep winding angle at the other dome having the larger diameter boss.

In accordance, the winding passage of the winding band 3 between two optional points on the outer surface of the mandrel 1 is not straight but curved. Here, the curvature of the curve of the band 3 on the mandrel 1 is inversely proportional to the diameter difference between two bosses 2, in other words, the winding passage along which the winding band 3 is wound on the mandrel 1 is steeply curved in proportion to the diameter difference between the two bosses 2.

It is well known that as the fiber glass impregnated with the thermosetting resin is wound on the mandrel along a curved winding passage, it has not good structural strength enduring high pressure due to the longer distance between two optional points of the curved winding passage than the straight winding passage. In result, the pressure vessel of which the vessel body comprises the fiber glass wound in the curved winding passage is apt to easily broken by even a low pressure.

As described above, the conventional filament winding method involves no problem in manufacturing a pressure vessel having at both dome peaks thereof the holes of the same diameter with each other, but involves several problems in manufacturing a pressure vessel having at both dome peaks the holes of the different diameters from each other.

SUMMARY OF THE INVENTION

It is, therefore, an object of the present invention to provide a method for filament winding a pressure vessel having at both end domes holes of different diameters and preferably used for high pressure combustors of rocket engines wherein the winding band constituting the vessel body is always wound on a mandrel in a straight winding passage irrespective of the diameter difference between the two holes.

In an embodiment, the present invention provides a method for filament winding a pressure vessel having at both end domes thereof holes of different diameters, characterized in that the method comprises the steps of: winding a winding band on a first mandrel at a relatively gentle winding angle, the first mandrel being provided with a small outer diameter boss at one end and a first jig which includes a boss of the same outer diameter as that of the small outer diameter boss at the other end heating the first mandrel with the winding band, then cutting off the first jig portion of the first mandrel with the winding band in order to obtain a first body; and winding the winding band on a second mandrel at a relatively steep winding angle, the second mandrel comprising the first body provided at the outside of the small outer diameter boss thereof with a second jig which includes a boss of an outer diameter larger than said small outer diameter at one end and a large diameter boss at the other end, heating the second mandrel with the winding band, then cutting off the second jig portion of the second mandrel with the winding band in order to obtain the pressure vessel.

BRIEF DESCRIPTION OF THE DRAWINGS

The above and other objects, features and other advantages of the present invention will be more clearly understood from the following detailed description taken in conjunction with the accompanying drawings, in which:

FIGS. 1A and 1B are schematic view showing the known method for manufacturing using a conventional filament winding method the pressure vessel having both end holes of same diameter, respectively, in which:

FIG. 1A is a front view; and

FIG. 1B is a side view:

FIGS. 2A to 2C are sectional views showing an embodiment of the present method for manufacturing using a filament winding method a pressure vessel having both end holes of different diameters, respectively, in which:

FIG. 2A is a sectional view showing the first winding process;

FIG. 2B is a sectional view showing the second winding process; and

FIG. 2C is a sectional view showing the pressure vessel product manufactured by the present method.

DESCRIPTION OF THE PREFERRED EMBODIMENTS

Figure 1A:
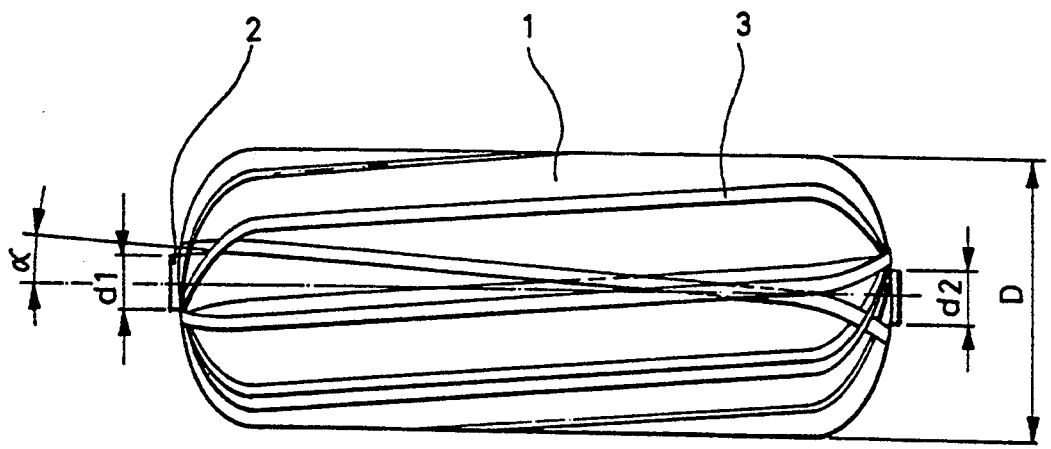
Figure 1B:
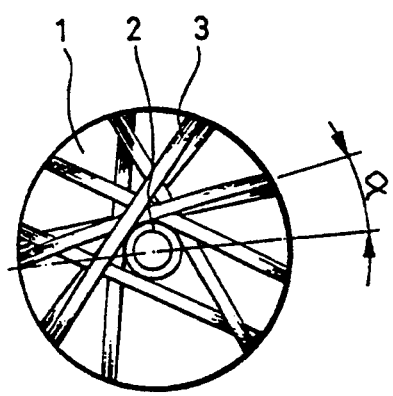
Figure 2A:
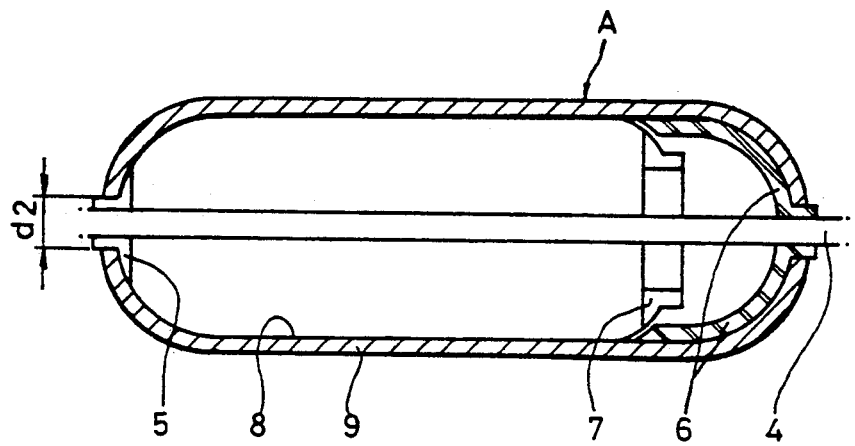
Figure 2B:
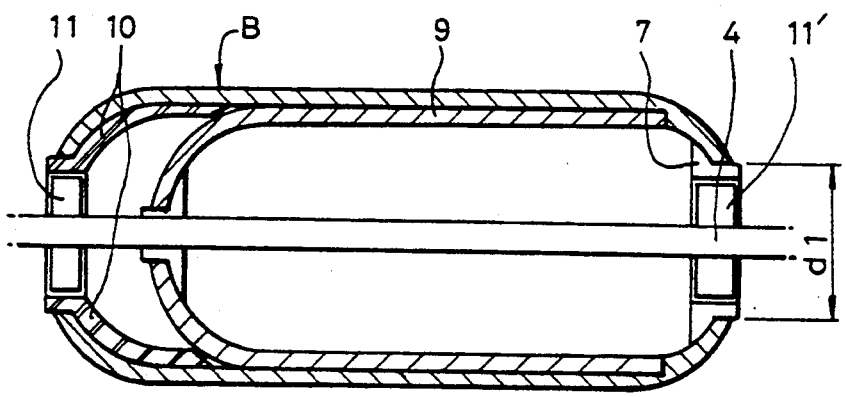
Figure 2C:
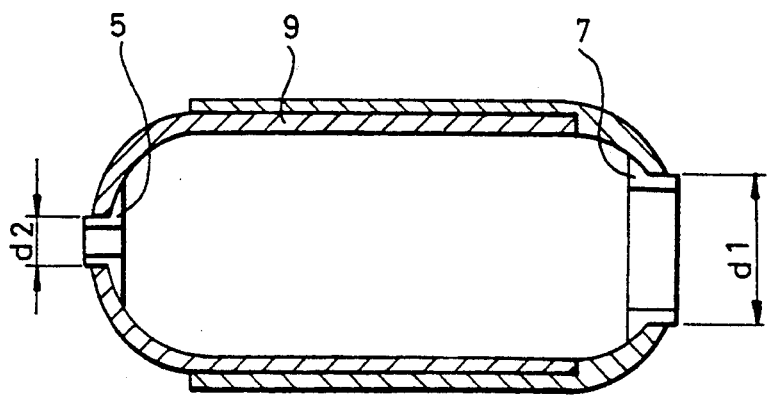

FIGS. 2A to 2C show an embodiment of a method for manufacturing a cylindrical pressure vessel provided at both end domes with holes of different diameters ($d_1 > d_2$), respectively, in which FIG. 2A shows the first winding process wherein a winding band is first wound on a first mandrel at a relatively gentle winding angle, FIG. 2B shows the second winding process wherein a winding band is again wound on a second mandrel including a first body obtained by the first process shown in FIG. 2A at a relatively steep winding angle and FIG. 2C shows the sectional structure of the pressure vessel manufactured by the present method.

With reference to FIG. 2A, the mandrel 8 is provided at an end dome thereof with a first metal boss 5 of an outer diameter $d_2$. The first boss 5 is tightly inserted onto a central rotating shaft 4 which passes along the central axis of the mandrel 8 throughout. At the other end dome of the mandrel 8, a first cup-shaped jig 6 is disposed such that it is tightly inserted onto the central rotating shaft 4. The first jig 6 includes at the peak thereof a boss of the outer diameter $d_2$ and has the same outer shape as an inner shape of the dome of the desired pressure vessel. Between the first boss 5 and the jig 6, the mandrel 8 is additionally provided with a second metal boss 7 of an outer diameter $d_1$.

In the first winding process of the present method, the winding band is first wound, on the basis of the boss of relatively smaller diameter $d_2$, on the outer surface of the mandrel 8 comprising the first and second metal bosses 5 and 7 and the first jig 6. At this time, the winding band is wound on the mandrel 8 at a relatively gentle winding angle due to the smaller diameter $d_2$ and also wound along a straight winding passage caused by the same outer diameters $d_2$ of both the first boss 5 and the first jig 6. If the first winding process is accomplished by repeatedly winding the band on the mandrel 8 to a predetermined thickness, the mandrel 8 with the winding band is separated from the central shaft 4 and then is treated in a hardening furnace such as an electric oven in order to make the thermosetting resin of the winding band thereon to be heated.

Sequentially, the mandrel 8 with the winding band after the thermosetting process is circumferentially cut at a portion near the circumferential skirt end of the first jig 6, that is, at a shoulder portion A of the dome near the second boss 7, thereby obtaining a first body 9.

Thereafter, the first body 9 comprising the mandrel 8 and the winding band wound on the mandrel 8 at the gentle winding angle is inserted using an annular connector 11' onto the central rotating shaft 4 in order to be subjected to the second winding process as depicted in FIG. 2B. The annular connector 11' has such inner and outer diameters that it tightly supports the first body 9 with respect to the central shaft 4 as it is inserted onto the shaft 4 and also inserted into the circular hole of the second boss 7. In addition, the first body 9 is covered at the outside of the first boss 5 with a second cup-shaped jig 10 which is disposed such that it is tightly inserted using another annular connector 11 of the same shape as that of the above-mentioned annular connector 11' onto the central rotating shaft 4, thereby obtaining a second mandrel. Here, the second jig 6 includes at the peak thereof a boss having the same outer diameter $d_1$ as that of the second metal boss 7 and has the same outer shape as the inner shape of the dome of the desired pressure vessel.

After preparing the second mandrel comprising the first body 9 covered with the second jig 10, the winding band is again wound, on the basis of the boss of relatively larger diameter $d_1$, on the outer surface of the second mandrel. At this time, the winding band is wound on the mandrel at a relatively steep winding angle due to the larger diameter $d_1$ of the boss and also wound along a straight winding passage caused by the same outer diameters $d_1$ of both the second boss 7 and the second jig 10.

If the second winding process is accomplished by repeatedly winding the band on the second mandrel to a predetermined thickness, the second mandrel with the winding band is separated from the central shaft 4 and then is treated in the hardening furnace in order to make the thermosetting resin of the winding band thereon to be heated.

In the similar manner to the first winding process, the second mandrel with the winding band after the above thermosetting process is then circumferentially cut at a shoulder portion B of the dome near the first boss 7, thereby obtaining a pressure vessel having the sectional structure as shown in FIG. 2C.

As described above, the present invention provides a method for manufacturing using a filament winding method a pressure vessel having at both end domes thereof holes of different diameters and preferably used for high pressure combustors of rocket engines. The present manufacturing method comprises two winding processes, that is, the first and second winding processes. In the first process, the first mandrel on which the winding band is wound is provided with a jig which makes the outer diameters of the opposite bosses of the mandrel be same with each other and is removed after hardening process. In the second process, the winding band is again wound on the second mandrel comprising a first body obtained from the first process and provided with a jig which makes the outer diameters of the opposite bosses of the second mandrel be same with each other and is removed after hardening process. In result, the winding band is always wound on the mandrel along straight winding passages in the two winding processes because the outer diameters of the opposite bosses of each mandrel are same with each other, thereby causing the pressure vessel manufactured by the present method to have a good structural strength efficiently enduring high pressure.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A method for filament winding a pressure vessel having at both end domes thereof holes of difference diameters, comprising the steps of:

winding a winding band on a first mandrel at a relatively gentle winding angle, said first mandrel being provided with a small outer diameter boss at one end and a first jig which includes a boss of the same outer diameter as that of said small outer diameter boss at the other end, heating said first mandrel with the winding band, then cutting off the first jig portion of the first mandrel with the winding band in order to obtain a first body; and winding the winding band on a second mandrel at a relatively steep winding angle, said second mandrel comprising said first body provided at the outside of the small outer diameter boss thereof with a second jig which includes a boss of an outer diameter larger than said small outer diameter at one end and a large diameter boss at the other end, heating said second mandrel with the winding band, then cutting off the second jig portion of the second mandrel with the winding band in order to obtain the pressure vessel.

* * * * *